United States Patent
Lin et al.

(10) Patent No.: US 9,065,495 B2
(45) Date of Patent: Jun. 23, 2015

(54) TWO-WAY RELAY TRANSMISSION METHOD AND APPARATUS APPLIED TO MULTI-INPUT MULTI-OUTPUT COMMUNICATION SYSTEMS

(71) Applicant: National Chiao Tung University, Hsinchu (TW)

(72) Inventors: David W. Lin, Hsinchu (TW); I-Chou A. Chung, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 14/286,463

(22) Filed: May 23, 2014

(65) Prior Publication Data

US 2014/0348216 A1    Nov. 27, 2014

(30) Foreign Application Priority Data

May 24, 2013    (TW) .............................. 102118544 A (51) Int. Cl.
| | |
|---|---|
| *H04B 7/26* | (2006.01) |
| *H04B 7/02* | (2006.01) |
| *H04B 7/04* | (2006.01) |
| *H04W 52/32* | (2009.01) |
| *H04W 52/46* | (2009.01) |

(52) U.S. Cl.
CPC .............. *H04B 7/026* (2013.01); *H04B 7/0413* (2013.01); *H04W 52/322* (2013.01); *H04W 52/46* (2013.01)

(58) Field of Classification Search
USPC ......................................................... 375/211
See application file for complete search history.

(56) References Cited

U.S. PATENT DOCUMENTS

| | | | | |
|---|---|---|---|---|
| 8,792,539 | B2 * | 7/2014 | Larsson ......................... | 375/220 |
| 2003/0086515 | A1 * | 5/2003 | Trans et al. ................... | 375/346 |
| 2008/0125032 | A1 * | 5/2008 | Jung et al. .................... | 455/7 |
| 2010/0194592 | A1 * | 8/2010 | Yim et al. ..................... | 340/905 |
| 2011/0103292 | A1 * | 5/2011 | Pasad et al. ................... | 370/315 |
| 2014/0105253 | A1 * | 4/2014 | Chung et al. .................. | 375/211 |
| 2014/0348216 | A1 * | 11/2014 | Lin et al. ....................... | 375/211 |

OTHER PUBLICATIONS

Fischer, Robert, "Precoding and Signal Shaping for Digital Transmission," New York; Wiley, 2002—Internet Citation—Available at : http://samples.sainsburybooks.co.uk/9780471727729_sample_385869.pdf.*

Koike-Akino, T. et al., "Optimized constellations for two-way wireless relaying with physical network coding," Selected Areas in Communications, IEEE Journal on , vol. 27, No. 5, pp. 773,787, Jun. 20097.*

(Continued)

*Primary Examiner* — Daniel Washburn
*Assistant Examiner* — Berhanu Tadese
(74) *Attorney, Agent, or Firm* — Muncy, Geissler, Olds & Lowe, P.C.

(57) ABSTRACT

A two-way relay transmission apparatus applied to multi-input multi-output communication systems that combines signals received from the terminals and performs a modulo operation to the combined signal to concentrate the signal points towards the center of the constellation. And then, the modulo version of the combined signal is broadcasted. As a result, the peak and average relay transmission powers can be reduced.

14 Claims, 3 Drawing Sheets

(56) References Cited

OTHER PUBLICATIONS

Tao Cui et al., "Memoryless relay strategies for two-way relay channels," Communications, IEEE Transactions on, vol. 57, No. 10, pp. 3132,3143, Oct. 2009 2008.*

Fischer, Robert, "Precoding and Signal Shaping for Digital Transmission," New York; Wiley, 2002—Internet Citation—Available at : http://samples.sainsburysebooks.co.uk/9780471727729_sample_385869.pdf.*

* cited by examiner

TWO-WAY RELAY TRANSMISSION METHOD AND APPARATUS APPLIED TO MULTI-INPUT MULTI-OUTPUT COMMUNICATION SYSTEMS

BACKGROUND OF THE INVENTION

1. Field of the Invention

The present invention relates to a two-way relay transmission apparatus and method, and more particularly, to a two-way relay transmission apparatus and method applied to multi-input multi-output (MIMO) communication systems.

2. Description of the Prior Art

Relay transmission is considered an important component in the continued evolution of wireless communication networks. Conventional half-duplex relay transmission can only perform one-way signal transmission or reception at any time and, therefore, requires 4 time slots to complete one bi-directional signal exchange in relay-assisted signal transmission between two terminals. In two-way relay transmission, the relay can receive from or transmit to two terminals simultaneously and therefore requires only 2 time slots to complete one bi-directional signal exchange in relay-assisted signal transmission, which can thus substantially improve the efficiency in spectrum utilization.

One conventional two-way relay transmission technique is the amplify-and-forward (AF) technique. However, it uses a greater-than-necessary "constellation" at the relay terminal. For example, consider the situation where both terminals employ Binary Phase Shift Keying (BPSK) with signal values 1 or −1, and the two terminal-to-relay channels both have unity gain. Then the received signal at the relay terminal may take one of three values: 0, 2 and −2. To maintain the same noise performance, the average transmission power needed for this ternary signal is twice that for BPSK, and the peak power is 4 times that for BPSK.

To sum up, how to reduce the peak and the average two-way relay transmission powers is an issue desiring solution.

SUMMARY OF THE INVENTION

The present invention provides a two-way relay transmission apparatus and method applicable to multi-input multi-output (MIMO) communication systems. It combines the signals received from the terminals and performs a modulo operation on the combined signal to concentrate the signal points towards the center of the constellation. And then, the modulo version of the combined signal is broadcasted. As a result, the peak and average relay transmission powers can be reduced.

One embodiment of the present invention provides a two-way relay transmission method applied to a multi-input multi-output communication system. The method comprises: receiving a first signal transmitted from at least one of two terminals by a relay apparatus, and combining the first signal; and performing a modulo operation to the combined first signal by the relay apparatus to produce a second signal, and broadcasting the second signal, wherein the modulo operation is represented by the below equation:

$$x_{Rk} = \alpha_M c\,\mathrm{mod}(\beta y_{Rk} + C, B)$$

wherein, $x_{Rk}$ is the second signal broadcasted by the relay apparatus at time k, $\alpha_M$ is a scaling factor of the form of a diagonal matrix, $\beta$ is a phase rotation factor of the form of a diagonal matrix, $y_{Rk}$ is the first signal received by the relay apparatus at time k, C is an offset vector, B is the modulus vector, and the cmod function is a function having a first complex vector variable and a second complex vector variable, with the function performing a symmetric complex modulo operation on at least one complex element x of the first complex vector variable according to a complex element of the second complex vector variable at the corresponding element position, the symmetric complex modulo operation on at least one complex element x of the first complex vector variable being representable by the below equation:

$$c\,\mathrm{mod}(x,B) = \mathrm{mod}(\Re\{x\},B) + j\,\mathrm{mod}(\Im\{x\},B)$$

wherein, $\Re\{\}$ indicates the real part of the quantity in the braces, $\Im\{\}$ indicates the imaginary part of the quantity in the braces, B is the complex element of the second complex vector variable at the position corresponding to the position of the complex element x where B is greater than or equal to a shift value of a duplicated rotated signal footprint, with the shift value being obtained by rotating a footprint of a signal received at the relay apparatus for a signal transmitted by one of the terminals by an angle θ, duplicating the rotated footprint once, and shifting the duplicated rotated signal footprint such that the distance between any point in the shifted duplicated rotated signal footprint and any point in the original rotated signal footprint is greater than or equal to $S_{im}$, wherein i is an index of the terminal, $S_{im}$ is a minimum of $A_{i0}|h_{i0}|$, $A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in 0, 1, ..., Q−1 for antenna indexing, and the mod function is a function having a first real variable and a second real variable, with the function taking a symmetric real modulo of the arbitrary first real variable y according to the second real variable, the symmetric real modulo operation being representable by the below equation:

$$\mathrm{mod}(y,B) = [(y + B/2)\%B] - B/2$$

wherein % is an asymmetric real modulo operation mathematically defined as $a\%b = a - \lfloor a/b \rfloor b$, where a and b are two arbitrary real numbers, and $\lfloor a/b \rfloor$ means the maximum integer smaller than or equal to a/b.

Another embodiment of the present invention provides a relay apparatus applied to two-way relay transmission in a multi-input multi-output communication system. The relay apparatus comprises at least one antenna and a computational module. The antenna is used for receiving a first signal transmitted from at least one of two terminals, and broadcasting a second signal. The computational module is used for combining the received first signal, and performing a modulo operation with the combined first signal to produce the second signal, wherein the modulo operation is represented by the below equation:

$$x_{Rk} = \alpha_M c\,\mathrm{mod}(\beta y_{Rk} + C, B)$$

wherein, $x_{Rk}$ is the second signal broadcasted by the relay apparatus at time k, $\alpha_M$ is a scaling factor of the form of a diagonal matrix, $\beta$ is a phase rotation factor of the form of a diagonal matrix, $y_{Rk}$ is the first signal received by the relay apparatus at time k, C is an offset vector, B is the modulus vector, and the cmod function is a function having a first complex vector variable and a second complex vector variable, with the function performing a symmetric complex modulo operation on at least one complex element x of the first complex vector variable according to a complex element of the second complex vector variable at the corresponding element position, the symmetric complex modulo operation on at least one complex element x of the first complex vector variable being representable by the below equation:

$$c\,\mathrm{mod}(x,B) = \mathrm{mod}(\Re\{x\},B) + j\,\mathrm{mod}(\Im\{x\},B)$$

wherein, $\Re\{\}$ indicates the real part of the quantity in the braces, $\Im\{\}$ indicates the imaginary part of the quantity in the braces, B is the complex element of the second complex vector variable at the position corresponding to the position of the complex element x where B is greater than or equal to a shift value of a duplicated rotated signal footprint, with the shift value obtained by rotating a footprint of a signal received at the relay apparatus for a signal transmitted by one of the terminals by an angle θ, duplicating the rotated footprint once, and shifting the duplicated rotated signal footprint such that the distance between any point in the shifted duplicated rotated signal footprint and any point in the original rotated signal footprint is greater than or equal to $S_{im}$, wherein i is an index of the terminal, $S_{im}$ is a minimum of $A_{i0}|h_{i0}|$, $A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in 0, 1, ..., $Q^{-1}$ for antenna indexing, and the mod function is a function having a first real variable and a second real variable, with the function taking a symmetric real modulo of the arbitrary first real variable y according to the second real variable, the symmetric real modulo operation being representable by the below equation:

$$\mathrm{mod}(y,B)=[(y+B/2)\%B]-B/2$$

wherein % is an asymmetric real modulo operation mathematically defined as $a\%b=a-\lfloor a/b \rfloor b$, where a and b are two arbitrary real numbers, and $\lfloor a/b \rfloor$ means the maximum integer smaller than or equal to a/b.

A further embodiment of the present invention provides a terminal applied to a multi-input multi-output communication system. The multi-input multi-output communication system has a relay apparatus. The relay apparatus combines a first signal transmitted from at least one of two terminals, performs a modulo operation with the combined first signal to produce a second signal, and broadcasts the second signal. The terminal comprises a plurality of transmitting antennas, at least one receiving antenna, and a computational module. The transmitting antennas are used for transmitting the first signal, and the receiving antenna is used for receiving the second signal. The computational module is used for acquiring the first signal transmitted from the other terminal from the second signal, with its operation representable by the below equation:

$$c\,\mathrm{mod}(y_{ik}H_i^{-1}\alpha_M^{-1}-C-\beta H_i x_{ik} B)\beta^{-1}$$

wherein i is an index of the terminal, $y_{ik}$ is the second signal received by the terminal at time k, $H_i$ is the channel matrix between the terminal and the relay apparatus, $\alpha_M$ is a scaling factor of the form of a diagonal matrix, C is an offset vector, B is the modulus vector, β is a phase rotation factor of the form of a diagonal matrix, $x_{ik}$ is the first signal transmitted by the terminal itself, and the cmod function is a function having a first complex vector variable and a second complex vector variable, with the function performing a symmetric complex modulo operation on at least one complex element x of the first complex vector variable according to a complex element of the second complex vector variable at the corresponding element position, the symmetric complex modulo operation on at least one complex element x of the first complex vector variable being representable by the below equation:

$$c\,\mathrm{mod}(x,B)=\mathrm{mod}(\Re\{x\},B)+j\,\mathrm{mod}(\Im\{x\},B)$$

wherein, $\Re\{\}$ indicates the real part of the quantity in the braces, $\Im\{\}$ indicates the imaginary part of the quantity in the brackets, B is the complex element of the second complex vector variable at the position corresponding to the position of the complex element x where B is greater than or equal to a shift value of a duplicated rotated signal footprint, with the shift value obtained by rotating a footprint of a signal received at the relay apparatus for a signal transmitted by one of the terminals by an angle θ, duplicating the rotated signal footprint once, and shifting the duplicated rotated signal footprint such that the distance between any point in the shifted duplicated rotated signal footprint and any point in the original rotated signal footprint is greater than or equal to $S_{im}$, wherein i is an index of the terminal, $S_{im}$ is a minimum of $A_{i0}|h_{i0}|$, $A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in 0, 1, ..., $Q^{-1}$ for antenna indexing, and the mod function is a function having a first real variable and a second real variable, with the function taking a symmetric real modulo of the arbitrary first real variable y according to the second real variable, the symmetric real modulo operation being representable by the below equation:

$$\mathrm{mod}(y,B)=[(y+B/2)\%B]-B/2$$

wherein % is an asymmetric real modulo operation mathematically defined as $a\%b=a-\lfloor a/b \rfloor b$, where a and b are two arbitrary real numbers, and $\lfloor a/b \rfloor$ means the maximum integer smaller than or equal to a/b.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENTS

The detailed explanation of the present invention is described as follows. The described preferred embodiments are presented for purposes of illustrations and description, and they are not intended to limit the scope of the present invention.

Figure 1:
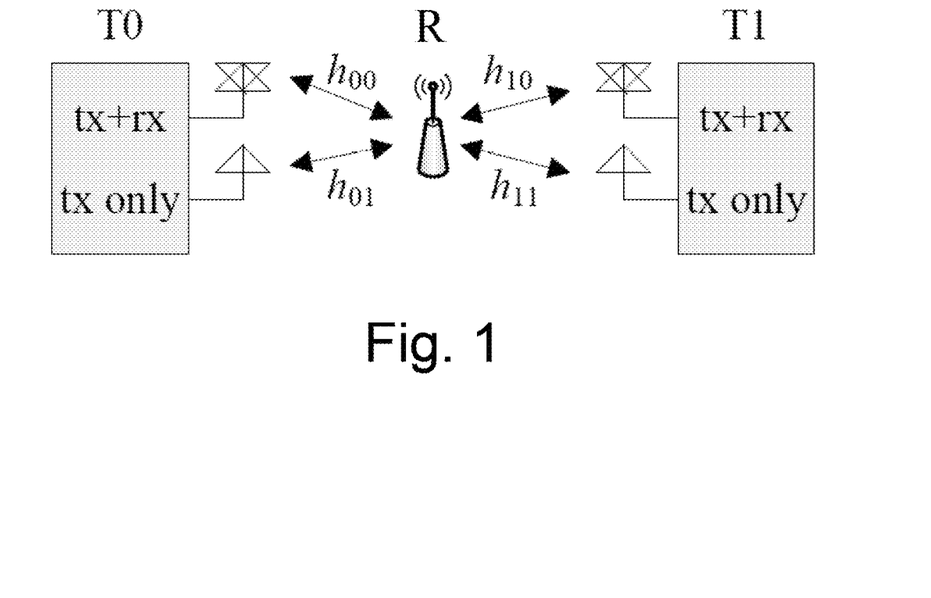
FIG. 1 is a diagram schematically illustrating one application scenario of the relay apparatus in one embodiment according to the present invention, wherein $h_{ij}$ (with indexes i and j being 0 or 1) signifies a channel coefficient, "tx" signifies a signal transmitting mechanism, and "rx" signifies a signal receiving mechanism.
Figure 2:
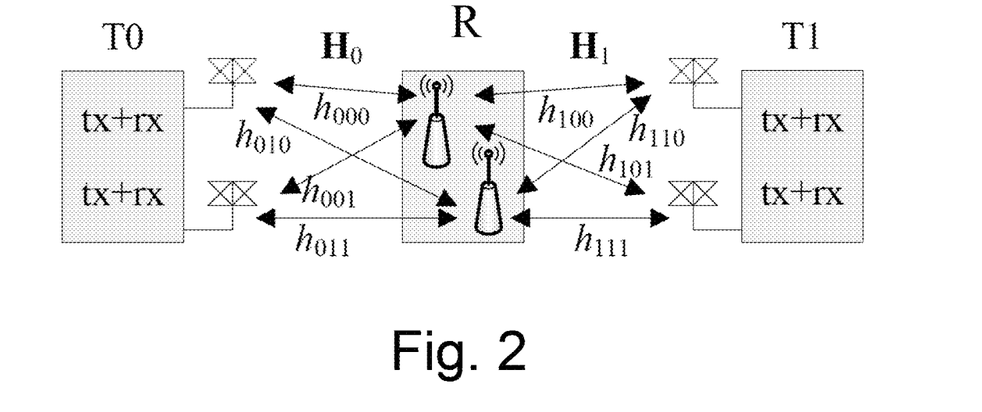
FIG. 2 is a diagram schematically illustrating another application scenario of the relay apparatus in one embodiment according to the present invention, wherein $h_{ikj}$ (with indexes i, k and j being 0 or 1) signifies a channel coefficient, "tx" signifies a signal transmitting mechanism, and "rx" signifies a signal receiving mechanism.

The two-way relay transmission apparatus and method of the present invention are capable of being applied to multi-input multi-output (MIMO) communication systems. For simplicity of explanation and ease of understanding, FIG. 1 and FIG. 2 are used to illustrate some application scenarios of the present invention. In FIG. 1, the terminals T0 and T1 each has two transmitting antennas and the terminals employ Alamouti space-time coding (STC) for signal transmission. Each terminal T0 and T1 uses only one receiving antenna for signal reception and the relay apparatus R has a single antenna. In FIG. 2, the terminals T0 and T1 and the relay apparatus R each has two transmitting antennas and two receiving antennas, and the terminals T0 and T1 employ spatial multiplexing (SM) in signal transmission.

For simplicity of explanation and ease of understanding, assume that the full channel state information (CSI) is available at both terminals T0 and T1 and the relay apparatus R. First, with reference to FIG. 1, let $s_{ij}$ denote the jth modulated data symbol transmitted from terminal Ti where i=0, 1; and let j=0, 1 be the indices of two data symbols over which Alamouti STC is performed. Let $x_{ijk}$ denote the signal transmitted at time k from antenna j of terminal Ti. Then we can represent $x_{ijk}$ by the following equations:

$$x_{ij0}=s_{ij}$$

$$x_{ij1}=(-1)^{\bar{j}}s_{i\bar{j}}^*$$

wherein the overbar indicates binary complementation, i.e., $\bar{0}=1$ and $\bar{1}=0$. Assume that the channel coefficients remain unchanged in the time period considered. Then the received signal $y_{Rk}$ at the relay apparatus R at time k can be represented by the equation:

$$y_{Rk} = \sum_{j=0}^{1} h_{0j}x_{0jk} + \sum_{j=0}^{1} h_{1j}x_{1jk} + z_{Rk}$$

wherein define $$\sum_{j=0}^{1} h_{0j}x_{0jk}$$

as $y_{R0k}$, define $$\sum_{j=0}^{1} h_{1j}x_{1jk}$$

as $y_{R1k}$, and $z_{Rk}$ denotes the noise at the relay apparatus R.

Let $x_{Rk}$ denote the signal transmitted by the relay apparatus R at time k. Then the received signal at terminal Ti at time k can be represented by the equation:

$$y_{ik}=h_{i0}x_{Rk}+z_{ik}$$

wherein $z_{ik}$ is the noise at terminal Ti. In conventional amplify-and-forward (AF) relaying, $x_{Rk}=\alpha_A y_{Rk}$ where the scaling factor $\alpha_A$ is set to meet the transmit power constraint of the relay apparatus R. The terminal Ti may subtract the "self-signal" $y_{Rik}$ from the scaled received signal $y_{ik}/(h_{i0}\alpha_A)$ to obtain a noisy version of signal $y_{R\bar{i}k}$. Normal Alamouti detection can then be invoked to recover the data symbols $s_{\bar{i}j}$ transmitted by another terminal $T^{\bar{i}}$. Since the Alamouti detector only needs to have $y_{R\bar{i}k}$, which is confined in a smaller signal footprint than $y_{R\bar{i}k}+y_{Rik}$ that is forwarded by conventional amplify-and-forward (AF) technology, the conventional AF technology thus transmits at a higher peak and a higher average relay transmission power than necessary.

According to the application scenario shown in FIG. 1, the two-way relay transmission method of one embodiment according to the present invention comprises: the relay apparatus R receives a first signal transmitted from at least one of two terminals T0 and T1, and combines the first signal; and the relay apparatus R performs a modulo operation to the combined first signal to produce a second signal, and broadcasts the second signal. Assume the signal received by the relay apparatus R is $y_{Rk}$. Then the signal $x_{Rk}$ transmitted by the relay apparatus R can be represented by equation (a):

$$x_{Rk}=\alpha_M c\,\mathrm{mod}(\beta y_{Rk}+C,B) \quad (a)$$

wherein, $\alpha_M$ is a scaling factor that satisfies the transmission power limitation of the relay apparatus; $\beta$ is a phase rotation factor, that is to say $\beta=e^{j\theta}$; C is a complex offset, B is the modulus which is a positive real number; and the cmod function is a function having a first complex vector variable and a second complex vector variable, with the function performing a symmetric complex modulo operation on at least one complex element x of the first complex vector variable according to a complex element of the second complex vector variable at the corresponding element position, the symmetric complex modulo operation on at least one complex element x of the first complex vector variable being representable by equation (b):

$$c\,\mathrm{mod}(x,B)=\mathrm{mod}(\mathfrak{R}\{x\},B)+j\,\mathrm{mod}(\mathfrak{I}\{x\},B) \quad (b)$$

wherein, B is the complex element of the second complex vector variable at the position corresponding to the position of the complex element x, $\mathfrak{R}\{\ \}$ indicates the real part of the quantity in the braces, and $\mathfrak{I}\{\ \}$ indicates the imaginary part of the quantity in the braces. In the application scenario shown in FIG. 1, the length of the foregoing first and second complex vectors is 1. The mod function is a function having a first real variable and a second real variable, with the function taking a symmetric real modulo of the arbitrary first real variable y according to the second real variable, the symmetric real modulo operation being representable by equation (c):

$$\mathrm{mod}(y,B)=[(y+B/2)\%B]-B/2 \quad (c)$$

wherein % is an asymmetric real modulo operation mathematically defined as $a\%b=a-\lfloor a/b \rfloor b$, where a and b are two arbitrary real numbers, and $\lfloor a/b \rfloor$ means the maximum integer smaller than or equal to a/b. It is noted that, for ease of reading, the equations in the description of the invention and the claims are numbered independently.

C can be judiciously chosen. In one embodiment, C is set to be the value that minimizes the power of $x_{Rk}$ at given values of the parameters $\alpha_M$, $\beta$ and B. In another embodiment, C is set to 0 or any value to simplify the design. Concerning the modulus B, note that if B is large enough such that each signal $y_{Rik}$ (i=0,1) can be contained in a square of area $B^2$ with enough margin to accommodate almost all noise $z_{Rk}$, then terminal Ti can obtain the unmoduloed signal through equation (d).

$$c\,\mathrm{mod}(y_{ik}/[h_{i0}\alpha_M]-C-\beta y_{Rik},B)/\beta=y_{R\bar{i}k}+z_{Rk}+z_{ik}/(h_{i0}\alpha_M\beta) \quad (d)$$

The unmoduloed signal can then be Alamouti detected and processed.

Figure 3:
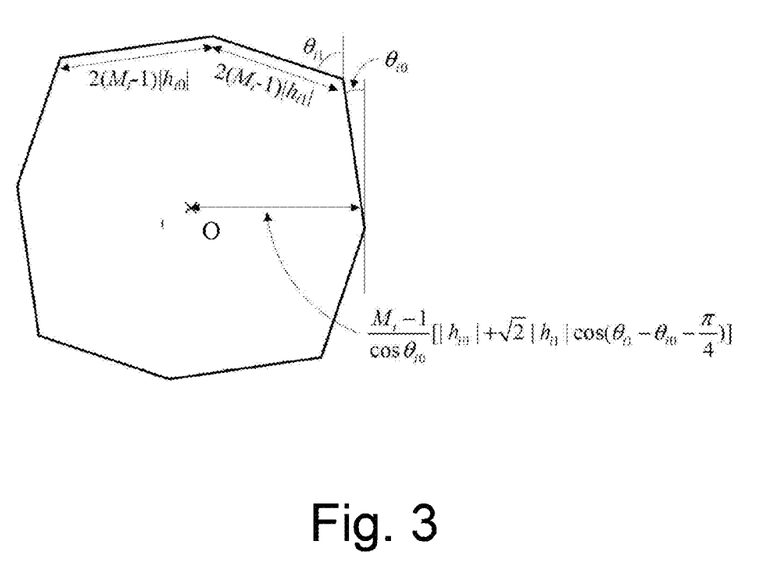
FIG. 3 is a diagram schematically illustrating a boundary of a signal footprint at the relay apparatus.

Assume the signal points of a Quadrature Amplitude Modulation (QAM) modulation have a minimum distance 2 and consider the signal transmitted from terminal Ti. Then a boundary of the footprint of the signal received by the relay apparatus R, in the noise-free condition, is as shown in FIG. 3. The signal footprint is a convolution of the constellations of $x_{ijk}$ transmitted through the channel coefficients $h_{ij}$ (j=0, 1). In FIG. 3, $M_i$ is the square root of the modulation order, and $\theta_{ij} = \angle h_{ij}$. The modulo operation may be viewed as the repetition of the signal to be moduloed on an orthogonal lattice defined by the modulus, and retaining only the result in the area $B^2$ covering the origin O. Too large a modulus will cause power inefficiency, whereas too small a modulus will degrade the transmission performance due to a reduced minimum distance between signal points.

Hence, B should be greater than or equal to a shift value obtained by rotating the footprint of the signal received at the relay apparatus R for a signal transmitted by a terminal by an angle θ, duplicating the rotated footprint once, and shifting the duplicated rotated signal footprint such that the distance between any point in the shifted duplicated rotated signal footprint and any point in the original rotated signal footprint is greater than or equal to $2h_{im}$, where $h_{im}$ is the smaller of $|h_{i1}|$ and $|h_{i0}|$. By letting B equal to this shift value, the minimum distance between signal points formed by the orthogonal lattice defined by the modulus B is made no smaller than $2h_{im}$. Therefore, for the example of FIG. 3, a modulus that satisfies the above conditions is given by equation (e):

$$B \geq 2\sec\theta_{i0}[(M_i-1)|h_{i0}| + \sqrt{2}(M_i-1)|h_{i1}|\cos(\theta_{i1}-\theta_{i0}-\pi/4)+h_{im}] \quad (e)$$

Define the right-hand side of equation (e) as $b_i$, and, for convenience, let $B = \max_i b_i$. Since different rotation angles may lead to different values of $b_i$, the signal footprint shown in FIG. 3 can be rotated to minimize the value of $\max_i b_i$. It is noted that due to the assumed use of square QAM, both $b_i$ vary periodically with θ with period π/2. It is also noted that a rotation of signal $y_{Rk}$ by θ in angle may equivalently be viewed as rotating the orthogonal lattice by −θ in angle while keeping the signal $y_{Rk}$ unrotated.

To specify a preferred β, let $\theta'_{ij} = \mod(\theta_{ij}+\theta-\pi/4,\pi/2)+\pi/4$, and then we have $0 \leq \theta'_{ij} < \pi/2$. Let $$m_i = \arg\min_j \theta'_{ij},$$

and for convenience of description define $\theta''_{i0} = \theta'_{im_i}, \theta''_{i1} = \theta'_{i\overline{m_i}}$
$h''_{i0} = h_{im_i}, h''_{i1} = h_{i\overline{m_i}}$ (wherein the overbars indicate binary complementation as before).

Define $$\theta_t = \arctan\frac{|h''_{i0}| - \sqrt{2}|h''_{i1}|\sin(\theta''_{i1} - \theta''_{i0} - \frac{\pi}{4})}{|h''_{i0}| + \sqrt{2}|h''_{i1}|\cos(\theta''_{i1} - \theta''_{i0} - \frac{\pi}{4})}.$$

If $\theta''_{i0} > \theta_t$, then redefine $\theta''_{ij}$ and $h''_{ij}$ as $\theta''_{i1} = \theta'_{im_i}, \theta''_{i0} = \theta'_{im_i} - \frac{\pi}{2}$
$h''_{i1} = h_{im_i}, h''_{i0} = h_{i\overline{m_i}}$ A preferred phase rotation factor is then given by $\beta = e^{j\theta_{opt}}$, wherein $\theta_{opt}$ can be expressed by the below equation:

$$\theta_{opt} = \arg\min_{0 \leq \theta < \pi/2} \max_i b''_i(\theta)$$

wherein $b''_i(\theta)$ is the shift value of the duplicated rotated signal footprint obtained by rotating the footprint of the signal received at the relay apparatus R for the signal transmitted by terminal Ti (i=0, 1) by an angle θ, duplicating the rotated footprint once, and shifting the duplicated rotated signal footprint such that the distance between any point in the shifted duplicated rotated signal footprint and any point in the original rotated signal footprint is greater than or equal to $2h_{im}$. $b''_i(\theta)$ can be expressed by the below equation:

$$b''_i(\theta) = 2\sec\theta''_{i0}[(M_i-1)|h''_{i0}| + \sqrt{2}(M_i-1)|h''_{i1}|\cos(\theta''_{i1}-\theta''_{i0}-\pi/4)+h_{im}]$$

It is noted that the above embodiment is illustrated with the assumption that the minimum distance of the signal points in the signal constellations transmitted from the terminal is 2. If the minimum distance of the signal points in the signal constellations transmitted from the terminal is another value, the corresponding coefficients in the abovementioned equations should be modified accordingly.

For example, if the minimum distance of the signal points in the signal constellation transmitted from the transmitting antenna j of the terminal Ti (i=0, 1) is $A_{ij}$, then the above equation (e) for the modulus can be modified as in the following equation:

$$B \geq \sec\theta_{i0}[A_{i0}(M_{i0}-1)|h_{i0}| + \sqrt{2}A_{i1}(M_{i1}-1)|h_{i1}|\cos(\theta_{i1}-\theta_{i0}-\pi/4)+S_{im}]$$

wherein $S_{im}$ is the smaller of $A_{i0}|h_{i0}|$ and $A_{i1}|h_{i1}|$.

Figure 4:
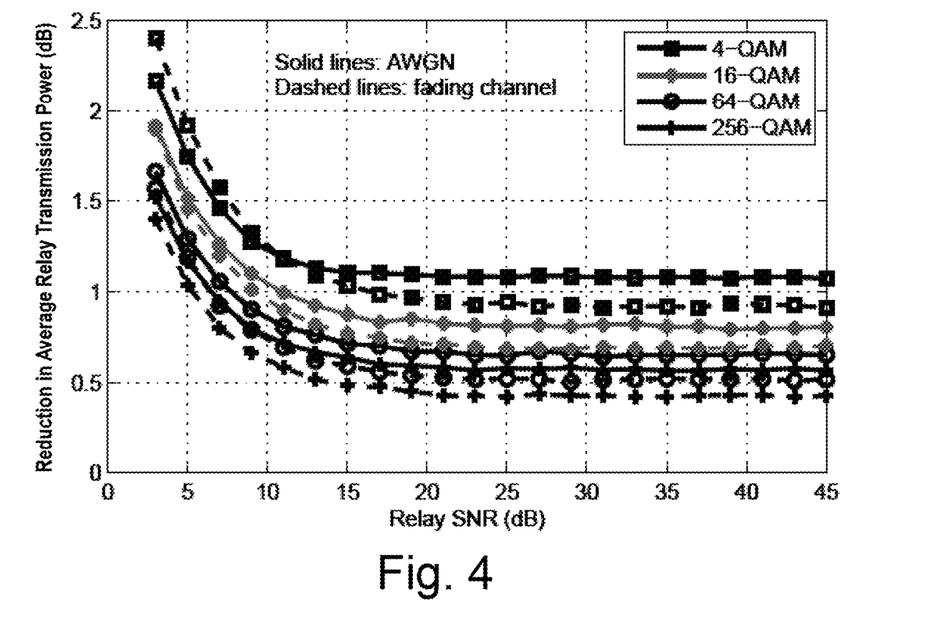
FIG. 4 is a diagram illustrating some simulation results of the two-way relay transmission method of the present invention, which shows that the invention is able to reduce the average relay transmission power.
Figure 5:
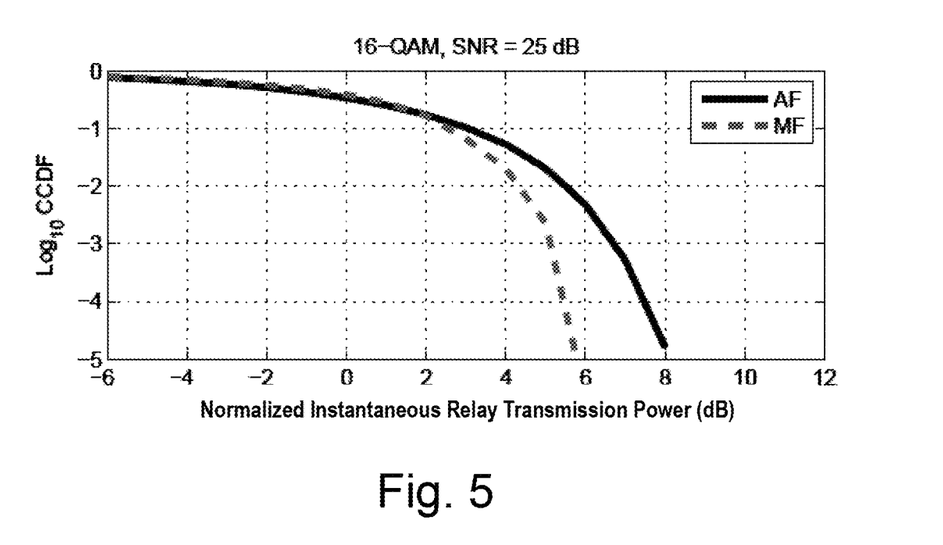
FIG. 5 is a diagram illustrating some simulation results of the two-way relay transmission method of the present invention, which shows that the invention is able to reduce the peak relay transmission power.

Please refer to FIG. 4, which shows some simulation results with 4, 16, 64 and 256-QAM. The channel between the terminal and the relay apparatus is either an additive white Gaussian noise (AWGN) channel (the solid lines in FIG. 4) or a Rayleigh fading channel (the dashed lines in FIG. 4). As shown in FIG. 4, when $\alpha_A = \alpha_M$, the present invention can reduce the average relay transmission power by roughly 0.5-1 dB in high signal-to-noise ratio (SNR). Please refer to FIG. 5, which shows the complementary cumulative distribution function (CCDF) of the normalized instantaneous relay transmission power with 16-QAM in AWGN channel. It shows that, compared to the amplify-and-forward technique (the solid line marked AF in FIG. 5), the two-way relay transmission method of the present invention (the dashed line marked MF in FIG. 5) can reduce the peak relay transmission power by roughly 2 dB.

Please refer to FIG. 2, which shows an application scenario of the two-way relay transmission method of the present invention that will be discussed now. Since the relay apparatus R has two antennas, the detailed operation is somewhat different from the application scenario shown in FIG. 1. However, those skilled in the art will observe that numerous modifications and alterations of the apparatus and method set forth above may be made while retaining the teachings of the invention.

The operation of the present invention applied to the application scenario shown in FIG. 2 is explained below. The signal vector $y_{Rk}$ received by the relay apparatus R can be represented by equation (f):

$$y_{Rk} = H_0 x_{0k} + H_1 x_{1k} + z_{Rk} \quad (f)$$

wherein $x_{ik}$ (i∈{0,1}) is the signal vector transmitted by the terminal Ti at time k, $H_i$ is the channel matrix between the terminal Ti and the relay apparatus R given by $$H_i = \begin{bmatrix} h_{i00} & h_{i01} \\ h_{i10} & h_{i11} \end{bmatrix}$$

and $z_{Rk}$ is the additive relay noise vector at time k. For simplicity, each element of the signal vector $y_{Rk}$ is separately processed with modulo operation and forwarding, rather than having all the elements of the signal vector $y_{Rk}$ processed together as a single vectorial entity. The signal vector $x_{Rk}$ transmitted by the relay apparatus R can be represented by equation (g):

$$x_{Rk}=\alpha_M c\,\mathrm{mod}(\beta y_{Rk}+C,B) \quad (g)$$

wherein $x_{Rk}$ is the signal broadcasted by the relay apparatus R at time k, $\alpha_M$ is a diagonal matrix of scaling factors, $\beta$ is a diagonal matrix of phase rotation factors, $y_{Rk}$ is the signal vector received by the relay apparatus R at time k, C is an offset vector, B is the modulus vector, and the cmod function is the same as described above and will not be repeated here. The abovementioned coefficients can be decided by the method for the application scenario shown in FIG. 1.

The terminal Ti can utilize equation (h) to obtain the desired signal vector through modulo-processed signal vector:

$$c\,\mathrm{mod}(y_{ik}H_i^{-1}\alpha_M^{-1}-C-\beta H_i x_{ik},B)\beta^{-1} \quad (h)$$

wherein $y_{ik}$ is the signal vector received by the terminal Ti at time k, $x_{ik}$ is the signal vector transmitted from the terminal Ti itself.

Please refer to FIG. 1 and FIG. 2. The relay apparatus R according to one embodiment of the present invention is applied in two-way relay transmission in a multi-input multi-output communication system. The relay apparatus comprises at least one antenna and a computational module (not shown in figures). The antenna is used for receiving a first signal transmitted from at least one of two terminals T0, T1, and broadcasting a second signal. The computational module is used for combining the received first signal, and performing a modulo operation with the combined first signal to produce the second signal. It has been comprehensively described above and will not be repeated again.

The terminals T0, T1 according to one embodiment of the present invention comprises a plurality of transmitting antennas, at least one receiving antenna and a computational module (not shown in figures). The transmitting antennas are used for transmitting a first signal. The receiving antenna is used for receiving a second signal. The computational module is used for acquiring the first signal transmitted by the other terminal from the second signal transmitted by the relay apparatus R. It has been comprehensively described above and will not be repeated again.

To sum up, the two-way relay transmission apparatus and method applied to multi-input multi-output communication systems according to the present invention combine signals received from terminals and perform a modulo operation to the combined signal to concentrate the signal points towards the center of the constellation. And then, the modulo version of the combined signal is broadcasted. As a result, the peak and average relay transmission powers can be reduced.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A two-way relay transmission method applied to multi-input multi-output communication systems, comprising:
receiving a first signal transmitted from at least one of two terminals by a relay apparatus, and combining the first signal; and
performing a modulo operation to the combined first signal by the relay apparatus to produce a second signal, and broadcasting the second signal, wherein the modulo operation is represented by equation (1):

$$x_{Rk}=\alpha_M c\,\mathrm{mod}(\beta y_{Rk}+C,B) \quad (1)$$

wherein, $x_{Rk}$ is the second signal broadcasted by the relay apparatus at time k, $\alpha_M$ is a scaling factor of the form of a diagonal matrix, $\beta$ is a phase rotation factor of the form of a diagonal matrix, $y_{Rk}$ is the first signal received by the relay apparatus at time k, C is an offset vector, B is the modulus vector, and the cmod function is a function having a first complex vector variable and a second complex vector variable, with the function performing a symmetric complex modulo operation on at least one complex element x of the first complex vector variable according to a complex element of the second complex vector variable at the corresponding element position, with the symmetric complex modulo operation on at least one complex element x of the first complex vector variable being represented by equation (2):

$$c\,\mathrm{mod}(x,B)=\mathrm{mod}(\Re\{x\},B)+j\,\mathrm{mod}(\Im\{x\},B) \quad (2)$$

wherein, $\Re\{\ \}$ indicates the real part of the quantity in the braces, $\Im\{\ \}$ indicates the imaginary part of the quantity in the braces, B is the complex element of the second complex vector variable at the position corresponding to the position of the complex element x where B is greater than or equal to a shift value of a duplicated rotated signal footprint, with the shift value being obtained by rotating a footprint of a signal received at the relay apparatus for a signal transmitted by one of the terminals by an angle $\theta$, duplicating the rotated footprint once, and shifting the duplicated rotated signal footprint such that the distance between any point in the shifted duplicated rotated signal footprint and any point in the original rotated signal footprint is greater than or equal to $S_{im}$, wherein i is an index of the terminal, $S_{im}$ is a minimum of $A_{i0}|h_{i0}|, A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in $0, 1, \ldots, Q-1$ for antenna indexing;

and the mod function is a function having a first real variable and a second real variable, with the function taking a symmetric real modulo of the arbitrary first real variable y according to the second real variable, with the symmetric real modulo operation being represented by equation (3):

$$\mathrm{mod}(y,B)=[(y+B/2)\%B]-B/2 \quad (3)$$

wherein % is an asymmetric real modulo operation mathematically defined as $a\%b=a-\lfloor a/b\rfloor b$, where a and b are two arbitrary real numbers, and $\lfloor a/b\rfloor$ means the maximum integer smaller than or equal to a/b.

2. The two-way relay transmission method applied to multi-input multi-output communication systems of claim 1, wherein B of the equation (2) satisfies equation (4):

$$B \geq \sec\theta_{i0}[A_{i0}(M_{i0}-1)|h_{i0}|+$$
$$\sqrt{2}A_{i1}(M_{i1}-1)|h_{i1}|\cos(\theta_{i1}-\theta_{i0}-\pi/4)+S_{im}] \quad (4)$$

wherein $\theta_{ij}=\angle h_{ij}$, $h_{ij}$ represents the channel coefficients, i is an index of the terminal, j is 0 or 1 for antenna indexing, $A_{ij}$ is the minimum distance of the signal points in the signal constellation transmitted from the transmitting antenna j of the terminal i, $M_{ij}$ is the square root of the modulation order of the signal transmitted from the transmitting antenna j of the terminal i, and $S_{im}$ is the smaller of $A_{i0}|h_{i0}|$ and $A_{i1}|h_{i1}|$.

3. The two-way relay transmission method applied to multi-input multi-output communication systems of claim 1, wherein at least one diagonal element of β of the equation (1) is represented by equation (5):

$$\beta = e^{j\theta_{opt}} \qquad (5)$$

wherein $\theta_{opt}$ is represented by equation (6):

$$\theta_{opt} = \mathrm{argmin}_{0 \le \theta < \pi/2} \max_i b''_i(\theta) \qquad (6)$$

wherein, i is an index of the terminal, $b''_i(\theta)$ is a shift value of a duplicated rotated signal footprint, with the shift value obtained by rotating a footprint of a signal received at the relay apparatus for a signal transmitted by one of the terminals by an angle θ, duplicating the rotated signal footprint once, and shifting the duplicated rotated signal footprint such that the distance between any point in the shifted duplicated rotated signal footprint and any point in the original rotated signal footprint is greater than or equal to $S_{im}$, wherein $S_{im}$ is a minimum of $A_{i0}|h_{i0}|, A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in $0, 1, \ldots, Q-1$ for antenna indexing.

4. The two-way relay transmission method applied to multi-input multi-output communication systems of claim 1, wherein at least one element of C of the equation (1) is the value making the power of corresponding element of $x_{Rk}$ minimum at given values of the parameters $\alpha_M$, β and B, or the value 0.

5. The two-way relay transmission method applied to multi-input multi-output communication systems of claim 1 further comprising:

acquiring the first signal transmitted from the other terminal from the second signal by one of the terminals using equation (7):

$$c\,\mathrm{mod}(y_{ik} H_i^{-1} \alpha_M^{-1} - C - \beta H_i x_{ik}, B)\beta^{-1} \qquad (7)$$

wherein i is an index of the terminal, $y_{ik}$ is the second signal received by the terminal at time k, $H_i$ is the channel matrix between the terminal and the relay apparatus, $x_{ik}$ is the first signal transmitted by the terminal itself.

6. A relay apparatus, applied to two-way relay transmission in multi-input multi-output communication systems, the relay apparatus comprising:

at least one antenna, for receiving a first signal transmitted from at least one of two terminals, and broadcasting a second signal; and a computational module, for combining the received first signal, and performing a modulo operation with the combined first signal to produce the second signal, wherein the modulo operation is represented by equation (1):

$$x_{Rk} = \alpha_M c\,\mathrm{mod}(\beta y_{Rk} + C, B) \qquad (1)$$

wherein, $x_{Rk}$ is the second signal broadcasted by the relay apparatus at time k, $\alpha_M$ is a scaling factor of the form of a diagonal matrix, β is a phase rotation factor of the form of a diagonal matrix, $y_{Rk}$ is the first signal received by the relay apparatus at time k, C is an offset vector, B is the modulus vector, and the cmod function is a function having a first complex vector variable and a second complex vector variable, with the function performing a symmetric complex modulo operation on at least one complex element x of the first complex vector variable according to a complex element of the second complex vector variable at the corresponding element position, with the symmetric complex modulo operation on at least one complex element x of the first complex vector variable being represented by equation (2):

$$c\,\mathrm{mod}(x,B) = \mathrm{mod}(\Re\{x\},B) + j\,\mathrm{mod}(\Im\{x\},B) \qquad (2)$$

wherein, R{ } indicates the real part of the quantity in the braces, ℑ{ } indicates the imaginary part of the quantity in the braces, B is the complex element of the second complex vector variable at the position corresponding to the position of the complex element x where B is greater than or equal to a shift value of a duplicated rotated signal footprint, with the shift value obtained by rotating a footprint of a signal received at the relay apparatus for a signal transmitted by one of the terminals by an angle θ, duplicating the rotated footprint once, and shifting the duplicated rotated signal footprint such that the distance between any point in the shifted duplicated rotated signal footprint and any point in the original rotated signal footprint is greater than or equal to $S_{im}$, wherein i is an index of the terminal, $S_{im}$ is a minimum of $A_{i0}|h_{i0}|, A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in $0, 1, \ldots, Q-1$ for antenna indexing;

and the mod function is a function having a first real variable and a second real variable, with the function taking a symmetric real modulo of the arbitrary first real variable y according to the second real variable, with the symmetric real modulo operation being represented by equation (3):

$$\mathrm{mod}(y,B) = [(y+B/2)\%B] - B/2 \qquad (3)$$

wherein % is an asymmetric real modulo operation mathematically defined as $a\%b = a - \lfloor a/b \rfloor b$, where a and b are two arbitrary real numbers, and $\lfloor a/b \rfloor$ means the maximum integer smaller than or equal to a/b.

7. The relay apparatus of claim 6, wherein B of the equation (2) satisfies equation (4):

$$B \ge \sec\theta_{i0}[A_{i0}(M_{i0}-1)|h_{i0}| + \sqrt{2} A_{i1}(M_{i1}-1)|h_{i1}|\cos(\theta_{i1}-\theta_{i0}-\pi/4) + S_{im}] \qquad (4)$$

wherein $\theta_{ij}=\angle h_{ij}$, $h_{ij}$ represents the channel coefficients, i is an index of the terminal, j is 0 or 1 for antenna indexing, $A_{ij}$ is the minimum distance of the signal points in the signal constellation transmitted from the transmitting antenna j of the terminal i, $M_{ij}$ is the square root of the modulation order of the signal transmitted from the transmitting antenna j of the terminal i, and $S_{im}$ is the smaller of $A_{i0}|h_{i0}|$ and $A_{i1}|h_{i1}|$.

8. The relay apparatus of claim 6, wherein at least one diagonal element of β of the equation (1) is represented by equation (5):

$$\beta = e^{j\theta_{opt}} \qquad (5)$$

wherein $\theta_{opt}$ is represented by equation (6):

$$\theta_{opt} = \mathrm{argmin}_{0 \le \theta < \pi/2} \max_i b''_i(\theta) \qquad (6)$$

wherein, i is an index of the terminal, $b''_i(\theta)$ is a shift value of a duplicated rotated signal footprint, with the shift value obtained by rotating a footprint of a signal received at the relay apparatus for a signal transmitted by one of the terminals by an angle θ, duplicating the rotated signal footprint once, and shifting the duplicated rotated signal footprint such that the distance between any point in the shifted duplicated rotated signal footprint and any point in the original rotated signal footprint is greater than or equal to $S_{im}$, wherein $S_{im}$ is a minimum of $A_{i0}|h_{i0}|, A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in 0, 1, ..., Q−1 for antenna indexing.

9. The relay apparatus of claim 6, wherein at least one element of C of the equation (1) is the value making the power of corresponding element of $x_{Rk}$ minimum at given values of the parameters $\alpha_M$, β and B, or the value 0.

10. The relay apparatus of claim 6, wherein the number of antennas is plural.

11. A terminal, applied to multi-input multi-output communication systems having a relay apparatus, the relay apparatus combines a first signal transmitted from at least one of two terminals, performs a modulo operation with the combined first signal to produce a second signal, and broadcasts the second signal, the terminal comprising:
- a plurality of transmitting antennas, for transmitting the first signal;
- at least one receiving antenna, for receiving the second signal; and
- a computational module, for acquiring the first signal transmitted by the other terminal from the second signal, the operation is represented by equation (7):

$$c\,mod(y_{ik}H_i^{-1}\alpha_M^{-1}-C-\beta H x_{ik}B)\beta^{-1} \quad (7)$$

wherein i is an index of the terminal, $y_{ik}$ is the second signal received by the terminal at time k, $H_i$ is the channel matrix between the terminal and the relay apparatus, $\alpha_M$ is a scaling factor of the form of a diagonal matrix, C is an offset vector, B is the modulus vector, β is a phase rotation factor of the form of a diagonal matrix, $x_{ik}$ is the first signal transmitted by the terminal itself, and the cmod function is a function having a first complex vector variable and a second complex vector variable, with the function performing a symmetric complex modulo operation on at least one complex element x of the first complex vector variable according to a complex element of the second complex vector variable at the corresponding element position, with the symmetric complex modulo operation on at least one complex element x of the first complex vector variable being represented by equation (2):

$$c\,mod(x,B)=mod(\mathfrak{R}\{x\},B)+j\,mod(\mathfrak{I}\{x\},B) \quad (2)$$

wherein, R{ } indicates the real part of the quantity in the braces, $\mathfrak{I}$ { } is the imaginary part of the quantity in the braces, B is the complex element of the second complex vector variable at the position corresponding to the position of the complex element x where B is greater than or equal to a shift value of a duplicated rotated signal footprint, with the shift value obtained by rotating a footprint of a signal received at the relay apparatus for a signal transmitted by one of the terminals by an angle θ, duplicating the rotated signal footprint once, and shifting the duplicated rotated signal footprint such that the distance between any point in the shifted duplicated rotated signal footprint and any point in the original rotated signal footprint is greater than or equal to $S_{im}$, wherein i is an index of the terminal, $S_{im}$ is a minimum of $A_{i0}|h_{i0}|, A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in 0, 1 ..., Q−1 for antenna indexing;

and the mod function is a function having a first real variable and a second real variable, with the function taking a symmetric real modulo of the arbitrary first real variable y according to the second real variable, with the symmetric real modulo operation being represented by equation (3):

$$mod(y,B)=[(y+B/2)\%B]-B/2 \quad (3)$$

wherein % is an asymmetric real modulo operation mathematically defined as $a\%b=a-\lfloor a/b \rfloor b$, where a and b are two arbitrary real numbers, and $\lfloor a/b \rfloor$ means the maximum integer smaller than or equal to a/b.

12. The terminal of claim 11, wherein B of the equation (2) satisfies equation (4):

$$B \geq sec\theta_{i0}[A_{i0}(M_{i0}-1)|h_{i0}|+\sqrt{2}A_{i1}(M_{i1}-1)|h_{i1}|cos(\theta_{i1}-\theta_{i0}-\pi/4)+S_{im}] \quad (4)$$

wherein $\theta_{ij}=\angle h_{ij}$, $h_{ij}$ is the channel coefficients, i is an index of the terminal, j is 0 or 1 for antenna indexing, $A_{ij}$ is the minimum distance of the signal points in the signal constellation transmitted from the transmitting antenna j of the terminal i, $M_{ij}$ is the square root of the modulation order of the signal transmitted from the transmitting antenna j of the terminal i, and $S_{im}$ is the smaller of $A_{i0}|h_{i0}|$ and $A_{i1}|h_{i1}|$.

13. The terminal of claim 11, wherein at least one diagonal element of β of the equation (7) is represented by equation (5):

$$\beta=e^{j\theta_{opt}} \quad (5)$$

wherein $\theta_{opt}$ is represented by equation (6):

$$\theta_{opt}=argmin_{0 \leq \theta < \pi/2}max_i b''_i(\theta) \quad (6)$$

wherein, i is an index of the terminal, $b''_i(\theta)$ is a shift value of a duplicated rotated signal footprint, with the shift value obtained by rotating a footprint of a signal received at the relay apparatus for a signal transmitted by one of the terminals by an angle θ, duplicating the rotated signal footprint once, and shifting the duplicated rotated signal footprint such that the distance between any point in the shifted duplicated rotated signal footprint and any point in the original rotated signal footprint is greater than or equal to $S_{im}$, wherein $S_{im}$ is a minimum of $A_{i0}|h_{i0}|, A_{i1}|h_{i1}|, \ldots, A_{i(Q-1)}|h_{i(Q-1)}|$, Q is a number of antennas of the terminal, $A_{ij}$ is the minimum distance of the signal points in the signal constellation transmitted from the transmitting antenna j of the terminal, $h_{ij}$ represents the channel coefficients, and j is in 0, 1, ..., Q−1 for antenna indexing.

14. The terminal of claim 11, wherein at least one element of C of the equation (7) is the value making the power of corresponding element of $x_{Rk}$ minimum at given values of the parameters $\alpha_M$, β and B, or the value 0.

* * * * *